(12) United States Patent
Oyanagi et al.

(10) Patent No.: US 8,257,480 B2
(45) Date of Patent: *Sep. 4, 2012

(54) INK SET, INK CONTAINER, INKJET RECORDING METHOD, RECORDING DEVICE, AND RECORDED MATTER

(75) Inventors: Takashi Oyanagi, Suwa (JP); Kiyohiko Takemoto, Suwa (JP); Chiyoshige Nakazawa, Suwa (JP)

(73) Assignee: Seiko Epson Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/913,696

(22) Filed: Oct. 27, 2010

(65) Prior Publication Data

US 2011/0036266 A1 Feb. 17, 2011

Related U.S. Application Data

(62) Division of application No. 12/021,855, filed on Jan. 29, 2008, now Pat. No. 7,846,246.

(30) Foreign Application Priority Data

Jan. 29, 2007 (JP) ................................. 2007-017276
Oct. 9, 2007 (JP) ................................. 2007-263801

(51) Int. Cl.
*C09D 11/02* (2006.01)

(52) U.S. Cl. ............... 106/31.6; 106/31.65; 106/31.86; 106/31.9; 523/160

(58) Field of Classification Search .............. 106/31.6, 106/31.65, 31.86, 31.9; 523/160; 347/100
See application file for complete search history.

(56) References Cited

U.S. PATENT DOCUMENTS

| | | | |
|---|---|---|---|
| 4,007,144 A | 2/1977 | Sanders et al. | |
| 5,212,212 A | 5/1993 | Fonda | |
| 5,453,121 A | 9/1995 | Nicholls | |
| 5,903,290 A | 5/1999 | Nicoloff, Jr. et al. | |
| 6,114,404 A | 9/2000 | Deeken et al. | |
| 6,179,415 B1 | 1/2001 | Okazaki et al. | |
| 6,187,897 B1 | 2/2001 | Kawashima et al. | |
| 6,846,074 B2 | 1/2005 | Hirai | |
| 7,156,909 B2 | 1/2007 | Oyanagi et al. | |
| 7,259,100 B2 | 8/2007 | Zurcher et al. | |
| 7,285,592 B2 | 10/2007 | Harz et al. | |
| 7,303,619 B2 | 12/2007 | Oyanagi | |
| 7,438,405 B2 | 10/2008 | Ichizawa et al. | |
| 7,581,829 B2 | 9/2009 | Oyanagi et al. | |
| 7,591,889 B2 | 9/2009 | Stoffel et al. | |
| 7,604,693 B2 * | 10/2009 | Oyanagi et al. ............... 106/31.6 |
| 7,866,807 B2 | 1/2011 | Makuta et al. | |
| 2003/0017353 A1 | 1/2003 | Yamaguchi et al. | |
| 2003/0089271 A1 | 5/2003 | Hirano et al. | |
| 2003/0157356 A1 | 8/2003 | Tamura et al. | |
| 2004/0266907 A1 | 12/2004 | Sugita et al. | |
| 2005/0039631 A1 | 2/2005 | Best et al. | |
| 2005/0176841 A1 | 8/2005 | Krohn | |
| 2006/0009546 A1 | 1/2006 | Brown | |
| 2007/0044684 A1 | 3/2007 | Nakano et al. | |
| 2007/0060670 A1 * | 3/2007 | Ellis ............................... 523/160 |
| 2007/0076069 A1 | 4/2007 | Edwards et al. | |
| 2007/0129457 A1 | 6/2007 | Nakano et al. | |
| 2007/0148585 A1 | 6/2007 | Kaneko et al. | |
| 2007/0281141 A1 | 12/2007 | Kohlweyer | |
| 2008/0081119 A1 | 4/2008 | Oyanagi et al. | |
| 2008/0090931 A1 | 4/2008 | Nagvekar et al. | |
| 2008/0096998 A1 | 4/2008 | Oyanagi et al. | |
| 2008/0145628 A1 | 6/2008 | Oyanagi et al. | |
| 2008/0173214 A1 | 7/2008 | Oyanagi et al. | |
| 2008/0182085 A1 | 7/2008 | Oyanagi et al. | |
| 2008/0213518 A1 | 9/2008 | Oyanagi et al. | |
| 2008/0250970 A1 | 10/2008 | Oyanagi et al. | |
| 2009/0053415 A1 | 2/2009 | Isobe | |
| 2009/0075036 A1 | 3/2009 | Oyanagi et al. | |
| 2009/0214833 A1 | 8/2009 | Oyanagi et al. | |
| 2009/0220695 A1 | 9/2009 | Oyanagi et al. | |
| 2009/0280265 A1 | 11/2009 | Oyanagi et al. | |
| 2009/0289973 A1 | 11/2009 | Makuta et al. | |
| 2010/0009136 A1 | 1/2010 | Oyanagi et al. | |
| 2011/0036266 A1 | 2/2011 | Oyanagi et al. | |

FOREIGN PATENT DOCUMENTS

| | | |
|---|---|---|
| CN | 1086637 | 6/2002 |
| EP | 1752504 A1 | 2/2007 |
| EP | 1806387 A1 | 7/2007 |
| EP | 1837381 A1 | 9/2007 |
| EP | 1950260 A1 | 7/2008 |
| GB | 1 547 283 | 6/1979 |
| JP | 11-165420 A | 6/1999 |
| JP | 11193316 A | 7/1999 |
| JP | 200044861 A | 2/2000 |
| JP | 2002-179960 A | 6/2002 |
| JP | 2003-292836 A | 10/2003 |
| JP | 2003-306625 A | 10/2003 |
| JP | 2004009359 A | 1/2004 |
| JP | 200499796 A | 4/2004 |
| JP | 2004-161852 A | 6/2004 |

(Continued)

OTHER PUBLICATIONS

Database WPI Week 200012, Derwent Publications Ltd., London GB, AN 2000-129322, Dec. 2000.
Extended European Search Report dated Apr. 21, 2008.
Extended European Search Report dated Nov. 2, 2011.
U.S. Appl. No. 12/074,308 dated Dec. 21, 2011.
U.S. Appl. No. 12/894,423 dated Nov. 10, 2011.

(Continued)

*Primary Examiner* — Helene Klemanski
(74) *Attorney, Agent, or Firm* — Sughrue Mion, PLLC

(57) ABSTRACT

An ink set, comprising: an oil based ink composition containing a metallic pigment; and at least one or more oil based ink compositions selected from a group consisting of a chromatic color ink composition containing chromatic color pigment, a black ink composition containing black pigment, and a white ink composition containing white pigment.

11 Claims, No Drawings

FOREIGN PATENT DOCUMENTS

| | | |
|---|---|---|
| JP | 2004-195797 A | 7/2004 |
| JP | 2004-197055 A | 7/2004 |
| JP | 2004535508 A | 11/2004 |
| JP | 2005-8690 A | 1/2005 |
| JP | 200523284 A | 1/2005 |
| JP | 2005-068250 A | 3/2005 |
| JP | 2005-068251 A | 3/2005 |
| JP | 2005-068252 A | 3/2005 |
| JP | 2005096254 A | 4/2005 |
| JP | 2005187659 A | 7/2005 |
| JP | 2006117931 A | 5/2006 |
| JP | 2006123529 A | 5/2006 |
| JP | 2006137183 A | 6/2006 |
| JP | 2006-265292 A | 10/2006 |
| JP | 2006-265524 A | 10/2006 |
| JP | 2006274029 A | 10/2006 |
| JP | 2006312711 A | 11/2006 |
| JP | 2007-016103 A | 1/2007 |
| JP | 2007-023161 A | 2/2007 |
| JP | 2007-046034 A | 2/2007 |
| JP | 2007-131741 A | 5/2007 |
| JP | 2007-169451 A | 7/2007 |
| WO | 9321235 A1 | 10/1993 |
| WO | 2005061566 A1 | 7/2005 |
| WO | 2006085992 A2 | 8/2006 |
| WO | 2006-101054 A1 | 9/2006 |
| WO | 2006112031 A1 | 10/2006 |

OTHER PUBLICATIONS

U.S. Appl. No. 13/197,174 dated Jan. 6, 2012.
U.S. Appl. No. 13/240,667 dated Dec. 12, 2011.
Office Action for U.S. Appl. No. 12/228,193 dated Mar. 8, 2012.

* cited by examiner

INK SET, INK CONTAINER, INKJET RECORDING METHOD, RECORDING DEVICE, AND RECORDED MATTER

This application is a Divisional of U.S. application Ser. No. 12/021,855 filed Jan. 29, 2008 now U.S. Pat. No. 7,846,246, which claims priority from Japanese Patent Application No. 2007-017276, filed on Jan. 29, 2007, and from Japanese Patent Application No. 2007-263801, filed on Oct. 9, 2007, the entire contents of which are incorporated by reference herein.

BACKGROUND

1. Technical Field

The present invention relates to an ink set, ink container, inkjet recording method, recording device, and recorded matter, and particularly relates to an ink set, ink container, inkjet recording method, recording device, and recorded matter, which can form a film with metallic gloss.

2. Related Art

Conventionally, gold bronze powder made of brass and aluminum fine powder and the like, printing ink with silver powder pigment, foil press printing using metal foil, and a thermal transfer method using a metal foil have been used to form a film with metallic gloss on printed matter.

However, with a coating film consisting of a printing ink that uses gold bronze powder, or silver powder, the average particle size of the metal powders that are used will be large, between 10 µm and 30 µm, and thus a flat metallic finish can be obtained, but achieving a mirror surface gloss is difficult. Furthermore, with the foil press or thermal transfer methods that use a metallic foil, an adhesive is applied as a printing carrier, and a flat metallic foil is pressed thereon, the recording carrier and the metallic foil are heated to cause firm adhesion, and the metal foil and recording carrier are thermally fused together. Therefore, a relatively good gloss can be achieved, but there are many manufacturing steps, and pressure and heat are applied during the manufacturing process, so the recording medium is restricted by the limited recording media that are resistant to heat and deformation.

In recent years, many examples of applying inkjet technology to printing have been seen, and one example of application is metallic printing. For example, JP-A-2002-179960 discloses technology of forming a metal film on a plastic spherical particle surface, and printing an ink composition that contains a pigment using inkjet printing. However, in order to obtain a highly metallic gloss, the spheres must be deformed and flattened to make a smooth surface, and with this technology, heating and pressing with a roller must be simultaneously performed. Therefore, the equipment and manufacturing processes are inevitably complicated by this point, and the recording medium is also restricted.

Furthermore, JP-A-2003-292836 and JP-A-2003-306625 disclose technology that uses an ink composition wherein a colloid of a precious metal such as gold or silver is dispersed. However, if the particle size of the precious metal colloid is small, within a range between several nanometers and several tens of nanometers in order to give priority to dispersion stability, discoloration caused by plasmon absorption will occur, and the ink composition will not provide a metallic gloss. In this case, after the coating film is dried, a metallic gloss is achieved by heating to 150° C. or higher in order to fuse the colloid particles together. Furthermore, if the particle size is increased in order to give priority to metallic gloss, the dispersion stability will be degraded, and problems with conglomeration and settling will be inevitable, and the storage life of the ink composition will be significantly reduced. Furthermore, although trivial, using precious metals as a material will increase the cost of the ink composition, so use will be restricted to applications with high added value, and there are disadvantages related to cost.

Furthermore, a metallic ink composition is known which uses a blend of metallic pigment and colorant as one ink composition, but when printing with this method, there are problems with the metallic pigment and the colorant separating and only the metallic pigment settling during storage of the ink composition, and this is a cause of printing defects such as the creation of a nonuniform image with variation and color loss occurring because only the colorant is absorbed into the recording medium leaving only the metallic pigment on the surface.

SUMMARY

An advantage of an aspects of the present invention is the ability to provide an ink set capable of forming a coating film with a metallic gloss of any color on printed matter using aluminum as a relatively inexpensive metallic material, and making the ink set of ink compositions which have high metallic mirror surface gloss.

As result of diligent research, the present inventors have discovered that printed matter with a high mirror surface gloss which was heretofore unattainable can be obtained by using a metal pigment dispersion, ink composition, inkjet recording method, and recorded matter that uses specific metal pigments. The present invention is based on these findings, and provides the following inventions.

[1] An ink set, containing an oil based ink composition containing a metallic pigment, and at least one or more oil based ink compositions selected from a group consisting of chromatic color ink composition containing chromatic color pigment, a black ink composition containing black pigment, and a white ink composition containing white pigment.

Preferred aspects of the invention are as shown below.

[2] The ink set according to [1], wherein the metallic pigment is a plate-like particle, where, on a planar surface of the plate-like particle if a longitudinal diameter is X, a lateral diameter is Y, and a thickness is Z, a 50% average particle diameter R50 which is the diameter of a corresponding circle determined by a surface area in the X-Y plane of the plate-like particle is between 0.5 and 3 µm, and R50/Z>5 is satisfied;

[3] The ink set according to [1], wherein the metal pigment is aluminum or an aluminum alloy;

[4] The ink set according to [1], wherein the metal pigment is made by crushing a metal deposition film;

[5] The ink set according to [1], wherein an oil based ink composition containing the metallic pigment contains the metallic pigment, an organic solvent, and a resin;

[6] The ink set according to [1], wherein concentration of the pigment in the oil based ink composition is between 0.1 and 10.0 wt %;

[7] The ink set according to [5], wherein the organic solvent includes one or more type of alkylene glycol ether that is a liquid at ambient temperature and pressure;

[8] The ink set according to [5], wherein the organic solvent is a mixture of an alkylene glycol diether, an alkylene glycol monoether, and a lactone;

[9] The ink set according to [5], wherein the resin is at least one type of resin selected from a group consisting of polyvinyl butyral, cellulose acetatobutyrate, and polyacryl polyol, polyurethane, vinylchloride-vinylacetate copolymer and/or a resin emulsion thereof;

[10] The ink set according to [5], wherein the oil based ink composition further has at least one type of acetylene glycol based surfactant and/or silicone based surfactant;

[11] The ink set according to [1], wherein the chromatic color pigment is an organic pigment, the black pigment is carbon black, and the white pigment is titanium dioxide and/or a hollow resin emulsion;

[12] An ink container containing the ink set according to any one of [1] through [11];

[13] An inkjet recording method, having: ejecting droplets of ink composition, and causing the droplets to adhere to a recording medium, an image being formed using the ink set according to any one of [1] through [11];

[14] The ink jet recording method according to [13], having: forming an image by simultaneously ejecting the oil based ink composition containing metallic pigment, and at least one type of composition selected from a group consisting of a chromatic color ink composition, a black ink composition, and a white ink composition;

[15] The inkjet recording method according to [13], having: forming an image using the oil based ink composition containing a metallic pigment, and then forming an image of any color using the chromatic color ink composition;

[16] The inkjet recording method according to [13], having: forming an image using the oil based ink composition containing a metallic pigment, then forming an image of any color using the chromatic color ink composition, and then forming an image using the black ink composition and/or the white ink composition;

[17] The inkjet recording method according to [13], wherein the method of ejecting the ink composition is a non-heating method;

[18] The inkjet recording method according to [13], wherein the recording medium is heated and printed;

[19] The inkjet recording method according to [18], wherein the heating temperature is between 30° C. and 80° C.;

[20] The inkjet recording method according to [19], wherein the heating is performed prior to printing and/or during printing and/or after printing;

[21] An inkjet recording ejecting droplets of ink composition, and causing the droplets to adhere to a recording medium, an image being formed using the ink set according to any one of [1] through [11]; and

[22] Recorded matter, recorded using the inkjet printing method according to any one of [13] through [20] and the recording device according to [21].

Using the ink set, inkjet recording method, and recorded matter of the present invention, an image with high metallic gloss can be formed on a recording medium using an ink composition containing metallic pigment, and furthermore, an image with metallic gloss of any arbitrary color and images which were not obtainable with a conventional ink set can be formed using an ink set which combines a chromatic color ink composition, a black ink composition, and a white ink composition.

DESCRIPTION OF EXEMPLARY EMBODIMENTS

Ink Set a. As described above, the ink set according to one aspect of the invention contains an oil based ink composition containing a metallic pigment; and at least one or more oil based ink compositions selected from a group consisting of a chromatic color ink composition containing chromatic color pigment, a black ink composition containing black pigment, and a white ink composition containing white pigment. Thereby, an image can be formed with a metallic gloss that is colored by chromatic color pigment, black pigment, and white pigment.

The metallic pigment is preferably a plate-like particle, where, on the planar surface of the plate-like particle, the longitudinal diameter is X, the lateral diameter is Y, and the thickness is Z, the 50% average particle diameter R50 which is the diameter of a corresponding circle determined by the surface area in the X-Y plane of the plate-like particle is between 0.5 and 3 μm, and R50/Z>5 is satisfied.

The term "plate-like particle" refers to particles which have essentially a flat surface (X-Y plane) and essentially a uniform thickness (Z). The plate-like particles are made by crushing a metal deposition film, and therefore metal particles with essentially a flat surface and essentially a uniform thickness can be obtained. Furthermore, the longitudinal diameter, lateral diameter, and thickness of the plate-like particle can be defined as X, Y, and Z respectively.

The term "diameter of a corresponding circle" refers to the diameter of an imaginary circle which has the same projected surface area as the projected surface area on the essentially flat surface (X-Y plane) of the plate-like particles of the metallic pigment. For example, if the essentially flat surface (X-Y plane) of the plate-like particles of the metallic pigment is polygonal, the diameter of the corresponding circle of the plate-like particle of metallic pigment is the diameter of the circle obtained by converting the projected area of that polygon to a circle.

The 50% average particle diameter R50 of a corresponding circle determined using the surface area of the X-Y plane of the plate-like particles is preferably between 0.5 and 3 μm, and more preferably between 0.75 and 2 μm, from the perspective of metallic gloss and printing stability.

Furthermore, the relationship between the 50% average particle diameter R50 of a corresponding circle and the thickness Z is preferably such that R50/Z>5, from the perspective of ensuring high metal gloss.

The metallic pigment is preferably aluminum or an aluminum alloy, from a perspective of cost and a perspective of ensuring metal gloss. If an aluminum alloy is used, the other metal elements or non-metal elements that can be added to the aluminum are not particularly restricted so long as the element has metallic gloss, but silver, gold, platinum, nickel, chrome, tin, zinc, indium, titanium, and copper and the like can be suggested, and these elements can be favorably used individually, or as an alloy, or as a mixture of at least one type of element.

The method of manufacturing the metallic pigment is to peel the interface between a metal or alloy layer and a peeling resin layer from a sheet substrate of a composite pigment source with a structure where a peeling resin layer and a metal or alloy layer is successively overlaid onto a sheet substrate surface, followed by crushing and pulverizing to obtain plate-like particles. Furthermore, for the case where the longitudinal diameter of the planar surface of the plate-like particle is X, the lateral diameter is Y, and the thickness is Z, the 50% average particle diameter R50 which is the diameter of a corresponding circle determined by the surface area in the X-Y plane of the plate-like particle obtained is between 0.5 and 3 μm, and the condition R50/Z is less than 5.

The longitudinal diameter X, lateral diameter Y, and the diameter of a corresponding circle on the surface of the metallic pigment (plate-like particle) can be measured using a particle image analyzer. For example, a flow type particle image analyzer FPIA-2100, FPIA-3000, or FPIA-3000S manufactured by Sysmex Corporation can be used as a the particle image analyzer.

The metal or alloy layer is preferably made using vacuum deposition, ion plating, or sputtering.

The thickness of the metal or metal alloy is 20 nm or higher and 100 nm or less. Thereby a pigment with an average thickness of 20 nm or higher and 100 nm or less can be obtained. If the average thickness is 20 nm or greater, the pigment will have excellent reflectivity and brightness, and will have good properties as a metallic pigment, and if the average thickness is 100 nm or less, an increase in the apparent specific gravity can be suppressed and stability in metallic pigment dispersion can be obtained.

The peeling resin layer of the composite pigments source is an undercoat layer under the metal or alloy layer, and is a peeling layer for increasing the peeling properties to the sheet substrate surface. The resin that is used as the resin peeling layer is preferably a polyvinyl alcohol, polyvinyl butyral, polyethylene glycol, polyacrylic acid, polyacrylamide, cellulose derivative, acrylic acid polymer, or modified nylon resin.

A solution containing a mixture of one or more of the aforementioned resins is applied to the recording medium, and a layer is formed by drying or the like. After applying, the resin can contain an additive such as a viscosity adjusting agent.

The peeling resin layer can be formed using commonly used gravure application, roller application, blade application, extrusion application, dip application, or spin coat method or the like. After applying and drying, the surface can be smoothed by calendaring if necessary.

The thickness of the peeling resin layer is not particularly restricted, but is preferably between 0.5 and 50 μm, more preferably between 1 and 10 μm. If the thickness is less than 0.5 μm, the amount of dispersion resin will be insufficient, and if the thickness is greater than 50 μm, peeling at the interface with the pigment layer will readily occur when rolled.

The sheet substrate is not particularly restricted, but can be a polyester film such as polytetrafluoroethylene, polyethylene, polypropylene, and polyethylene terephthalate, a polyamide film such as 66-nylon and 6-nylon, or a peeling film such as a polycarbonate film, triacetate film, or polyimide film, or the like. Preferably, the sheet substrate is made of polyethylene terephthalate or a copolymer thereof.

The thickness of the sheet substrate is not particularly restricted, but is preferably between 10 and 150 μm. If the thickness is 10 μm or greater, handling problems such as processing will not occur, and if the thickness is 150 μm or less, the flexibility will be excellent, and problems will not occur when rolled or peeled or the like.

Furthermore, the metal or alloy layer can be enclosed between protective layers as shown in JP-A-2005-68250. The protective layer can be a silicon oxide layer or a protective resin layer.

The silicon oxide layer is not particularly restricted so long as the layer contains silicon oxide, but is preferably formed from a silicon alkoxide such as tetraalkoxysilane, or polymer thereof.

The silicon oxide layer film is formed by applying a solution of silicon alkoxide or polymer thereof dissolved in alcohol, and then baking.

The protective resin layer is not particularly restricted so long as the resin does not dissolve in the dispersion solvent, and examples include polyvinyl alcohol, polyethylene glycol, polyacrylic acid, polyacrylamide, or a cellulose derivative, and is preferably a polyvinyl alcohol or a cellulose derivative.

An aqueous solution containing a mixture of one or more of the aforementioned resins is applied, and a layer is formed by drying or the like. The application solution can contain an additive such as a viscosity adjusting agent.

Application of the silicon oxide and resin is performed by the same method as application of the peeling resin layer.

The thickness of the protective layer is not particularly restricted, but is preferably in a range between 50 and 150 nm. If the thickness is less than 50 nm, the mechanical strength will be insufficient, but if the thickness exceeds 150 nm, the strength will be too high, so crushing and dispersing will be difficult, and peeling will occur at the interface with the metal or alloy layer.

Furthermore, a layer of colored material can be placed between the "protective layer" and the "metal or alloy layer."

The colored layer is added to obtain a composite pigment of any color, and the materials are not particularly restricted so long as the colored material can provide an arbitrary color or hue, in addition to the metal gloss and brightness of the metallic pigment of the invention. The colored material used in the colored layer can be either a pigment or dye. Furthermore, any commonly used pigment or dye can be suitably used.

In this case, the "pigment" that is used in the colored layer refers to a natural pigment, synthetic organic pigment, or synthetic inorganic pigment or the like as generally defined in the field of pigment chemistry, and is different than the "compound pigment" of the present invention formed with a multilayer structure.

The method of forming the colored layer is not particularly restricted, but is preferably formed by coating.

Furthermore, if the colorant that is used in the colored layer is a pigment, a resin for dispersing the colorant is preferably included, and the resin for dispersing the colorant is preferably made by dispersing or dissolving a pigment, a resin for dispersing the colorant, and other additives if necessary, in a solvent, forming a uniform liquid layer by coating this solution, and then drying to make a thin resin film.

Note, when manufacturing the composite pigment source, both the colorant layer and the protective layer are preferably formed by coating in order to improve productivity.

The composite pigment source may also have a layered construction with a plurality of multilayered structures of successive peeling resin layers, and metal or alloy layers. At this time, the total thickness of the multilayer structure containing a metal or alloy layer, or in other words the thickness of metal or alloy—peeling resin layer—metal or alloy layer, or the peeling resin layer—metal or alloy layer is preferably 5000 nm or less. If the thickness is 5000 nm or less, cracking and peeling will not occur even if the composite pigment source is rolled up, and storage properties will be excellent. Furthermore, when a pigment is formed, the pigment will be favorable, with excellent brightness.

Furthermore, a structure containing multiple successive layering of a peeling resin layer and a metal or an alloy layer on both sides of the sheet substrate surface can be suggested, but this is not a restriction.

The method of peeling from the sheet substrate is not particularly restricted, but a method of immersing the composite pigment source in a liquid, or a method of immersing in a liquid while simultaneously applying ultrasonic waves, peeling, and then crushing the peeled composite pigment are preferable.

With the pigment obtained as described above, the peeling resin layer also acts as a protective colloid, and therefore a stable dispersion can be obtained simply by dispersing in a solvent. Furthermore, with the ink composition that uses this pigment, the resin derived from the peeling resin layer also functions to provide adhesion to the recording medium, such as paper.

The oil based ink composition used in the ink set of this embodiment contains the aforementioned metallic pigment, organic solvent, and resin.

The concentration of the metallic pigment in the ink composition is preferably between 0.1 and 10.0 wt %.

If the concentration of metallic pigment in the ink composition is 0.1 wt % or higher and less than 1.5 wt %, a half mirror gloss surface, or in other words a glossy feel can be achieved by ejecting an amount of ink that does not sufficiently cover the printing surface, but printing on a texture where the background appears to be transparent will be possible, and a metal glossy surface with high gloss can be formed by ejecting sufficient ink to cover the printing surface. Therefore, this is suitable for forming a half mirror image on a transparent recording medium, or for providing a metal gloss surface with high gloss. Furthermore, if the concentration of metallic pigment in the ink composition is 1.5 wt % or higher and 3.0 wt % or lower, the metal pigment will be randomly arranged on the printing surface, so a high gloss will not be achieved and a metal gloss surface with a matte finish can be formed. Therefore, this is suitable for forming a shielding layer on a transparent recording medium.

The organic solvent is preferably a polar organic solvent, and examples include alcohols (such as methyl alcohol, ethyl alcohol, propyl alcohol, butyl alcohol, isopropyl alcohol, or fluoridated alcohol and the like), ketones (such as acetone, methylethyl ketone, and cyclohexanone and the like), carboxylate esters (such as methyl acetate, ethyl acetate, propyl acetate, butyl acetate, methyl propionate, and ethyl propionate and the like), and ethers (such as diethyl ether, dipropyl ether, tetrahydrofuran, and dioxane, and the like).

In particular, the organic solvent preferably contains one or more type of an alkylene glycol ether that is a liquid at ambient temperature and pressure.

The alkylene glycol ether can be an ethylene glycol based ether or propylene glycol based ether which contains a methyl, n-propyl, i-propyl, n-butyl, i-butyl, hexyl, or 2-ethyl hexyl resin group and an allyl or phenyl group having a double bond as a base. These alkylene glycol ethers are colorless with little odor, and have an ether group and a hydroxyl group in the molecule, and therefore demonstrate the properties of both alcohols and ethers, and are liquid at room temperature. Furthermore, these alkylene glycol ethers can be monoethers where only one of the hydroxyl groups has been substituted, or can be diethers, where both of the hydroxyl groups have been substituted, and furthermore a plurality of types can be combined and used together.

In particular, the organic solvent is preferably a blend of an alkylene glycol diether, an alkylene glycol monoether, and a lactone.

Examples of the alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol dimethyl ether, diethylene glycol diethyl ether, triethylene glycol monomethyl ether, triethylene glycol monoethyl ether, triethylene glycol monobutyl ether, tetraethylene glycol monomethyl ether, etraethylene glycol monoethyl ether, propylene glycol monomethyl ether, propylene glycol monoethyl ether, dipropylene glycol monomethyl ether, dipropylene glycol monoethyl ether, and the like.

Examples of alkylene glycol diethers include ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and the like.

Furthermore, the lactone can be γ-butyrolactone, δ-valerolactone, and ε-caprolactone and the like.

The objective of the present invention can be better achieved by using one of the aforementioned favorable constructions.

The resin that is used in the oil based ink composition is for example an acrylic resin, a styrene-acrylic resin, a rosin modified resin, a terpene based resin, a polyester resin, a polyamide resin, an epoxy resin, a vinylchloride resin, a vinylchloride-vinylacetate copolymer, a fiber based resin (such as cellulose acetate butyrate, hydroxypropyl cellulose), polyvinyl butyral, polyacryl polyol, polyvinyl alcohol, and polyurethane and the like.

Furthermore, fine particles of a nonaqueous dispersion polymer can also be used as the resin. These are dispersions where fine particles of polyurethane resin, acrylic resin, acrylpolyol resin or the like are stably dispersed in an organic solvent. Examples include polyurethane resins such as "Sanprene IB-501" and "Sanprene IB-F370", manufactured by Sanyo Chemical Industries, Ltd., and acrylicpolyol resins such as "N-2043-60MEX" and "N-2043-AF-1" manufactured by Harima Chemicals, Inc.

The amount of resin emulsion added to the ink composition is preferably 0.1 wt % or higher and 10 wt % or lower, in order to further increase the adhesion of the pigment to the recording medium. If the amount added is excessive, printing stability will not be achieved, but if insufficient, adhesion will be insufficient.

The ink composition preferably contains at least one type of glycerin, polyalkylene glycol, or sugar. The amount of at least one type of glycerin, polyalkylene glycol, or sugar that is added to the ink composition is preferably 0.1 wt % or higher and 10 wt % or lower.

With this type of preferred construction, drying of the ink can be suppressed, plugging can be prevented, ejection of the ink can be stabilized, and the image quality of the recorded matter can be favorable.

The polyalkylene glycol is a linear polymer compound with a construction of repeating ether bonds in the main chain, and is produced for example by ring opening polymerization of a cyclic ether.

Specific examples of polyalkylene glycol include polymers such as polyethylene glycol and polypropylene glycol, ethylene oxide-propylene oxide copolymer and derivatives thereof. The copolymer can be any type of copolymer such as a random copolymer, block copolymer, graft copolymer, or alternating copolymer.

Preferable examples of a polyalkylene glycol include goes expressed by the following formula.

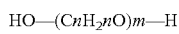

HO—(CnH$_2$nO)m—H (In the above formula, n represents an integer between 1 and 5, and m represents an integer between 1 and 100.)

Note, in the formula, (CnH$_2$nO)$_m$ can have a single value for n or can have a combination of two or more values within the range of integer n. For example, the term becomes (C$_3$H$_6$O)m if n is 3, or becomes (CH$_2$O—C$_4$H$_8$O)m if n is a combination of 1 and 4. Furthermore, the integer m can be a single constant or a combination of two or more constants within the aforementioned range. For instance, in the above example, if m is a combination of 20 and 40, the term becomes $(CH_2O)_{20}$—$(C_2H_4O)_{40}$, and if m is a combination of 10 and 30, the term becomes $(CH_2O)_{10}$—$(C_4H_8O)_{30}$. Furthermore, the integers n and m can be in any combination with in the aforementioned ranges.

The sugar can be a simple sugar such as pentose, hexose, heptose, octose, a polysaccharide such as a disaccharide, trisaccharide, or tetrasaccharide, as well as derivatives thereof such as sugar alcohols, reduced derivatives such as deoxy acids, oxidized derivatives such as aldonic acid and uronic acid, dehydrated derivatives such as glycosine, as well as amino acids and thiosugars and the like. Polysaccharides represent a wide range of saccharides, and include substances widely found in nature such as alginic acid, dextrin, and cellulose.

The oil based ink composition preferably contains at least one type of acetylene glycol based surfactant and/or silicone based surfactant. The amount of surfactant added is preferably 0.01 wt % or higher and 10 wt % or lower, based on the amount of pigment in the ink composition.

With this preferred composition, the wettability of the oil based ink composition towards the recording medium will be improved, and rapid adhesion can be achieved.

Preferred examples of the acetylene glycol based surfactant include Surfinol 465 (trademark), Surfinol 104 (trademark) (product trade names, manufactured by Air Products and Chemicals Inc.), Olfin STG (trademark), Olfin E1010 (trademark) (product trade names, manufactured by Nissin Chemical Industry Co., Ltd.), and the like.

Preferred examples of the silicone surfactant include polyester modified silicone and polyether modified silicone. Specific examples include BYK-347, BYK-348, BYK-UV3500, BYK-UV3510, BYK-UV3530, and BYK-UV3570 (manufactured by BYK Chemie Japan).

The oil based ink composition can be prepared by a commonly known and used method. For example, the aforementioned metallic pigment, dispersing agent, and solvent are first blended together and then a pigment dispersion is prepared using a bowl mill, bead mill, ultrasonic waves, or jet mill or the like, in order to achieve the desired ink characteristics. Furthermore, a pigment ink composition can be obtained by adding a binder resin, solvent, and other additives (such as dispersion assisting agents and viscosity adjusting agents) while mixing.

In addition, the composite pigment source is ultrasonically treated in a solvent to make a composite pigment dispersion, and then the necessary ink solvents can be blended, or the composite pigment source can be ultrasonically treated in the ink solvent to directly make the ink composition.

The physical properties of the oil based ink composition are not particularly restricted, but for example the surface tension is preferably between 20 and 50 mN/m. If the surface tension is less than 20 mN/m, the ink composition will spread out on the surface of the inkjet recording printer head, or will smear, and ejection of ink droplets will be difficult. On the other hand, if the surface tension exceeds 50 mN/m, the ink composition will not spread out on the surface of the recording medium, and favorable printing will not be possible.

Next, the chromatic color ink compositions, black ink compositions, and white ink compositions that are used in the ink set of this aspect will be described.

The chromatic color ink composition contains a chromatic color pigment. The term "colored" refers to any color other than achromatic colors from white through gray to black. The chromatic color pigments are preferably organic pigments, from the perspective of storage stability such as lightfastness, weatherfastness, and gasfastness.

Specific examples include azo pigments such as insoluble azo pigments, condensed azo pigments, azo lake, and chelated azo pigments; polycyclic pigments such as phthalocyanine pigments, perylene and perinone pigments, anthraquinone pigments, quinacridone pigments, dioxane pigments, thioindigo pigments, isoindolinone pigments, and quinophthalone pigments; as well as dye chelates (for example basic dye chelates, acidic dye chelates, and the like), dye lakes (basic dye lakes, acidic dye lakes), nitro pigments, nitroso pigments, aniline black, and daylight fluorescent pigments and the like. These pigments can be used independently, or used as a combination of two or more. More specific examples include C. I. Pigment yellow 1 (fast yellow G), 2, 3, 12 (diazo yellow AAA), 13, 14, 16, 17, 24, 34, 35, 37, 42 (yellow iron oxide), 53, 55, 73, 74, 75, 81, 83 (dis-azo yellow HR), 93, 94, 95, 97, 98, 100, 101, 104, 108, 109, 110, 117, 120, 128, 129, 138, 139, 150, 153, 154, 155, 180, 185, 213, C.I. Pigment red 1, 2, 3, 5, 7, 17, 22 (brilliant fast scarlet), 23, 31, 38, 48:2 (permanent red 2B (Ba)), 48:2 (permanent red 2B (Ca)), 48:3 (permanent red 2B (Sr)), 48:4 (permanent red 2B (Mn)), 49:1, 52:2, 53:1, 57:1 (brilliant carmine 6B), 60:1, 63:1, 63:2, 64:1, 81 (rhodamine 6G lake), 83, 88, 101 (bengara), 104, 105, 106, 112, 114, 122 (quinacridone magenta), 123, 146, 149, 166, 168, 170, 172, 177, 178, 179, 184, 185, 190, 193, 202, 209, 219, C.I. Pigment violet 19, C.I. Pigment blue 1, 2, 15 (phthalocyanine blue R), 15:1, 15:2, 15:3 (phthalocyanine blue G), 15:4, 15:6 (phthalocyanine blue E), 16, 17:1, 22, 56, 60, 63, C. I. Pigment green 1, 4, 7, 8, 10, 17, 18, 36, and the like.

Note, even pigments which are not shown in the color index can be used so long as the pigment is water insoluble.

The black ink composition contains a black pigment. Examples of black pigments include furnace black, lamp black, acetylene black, channel black, and other carbon blacks (C. I. Pigment black 7), as well as copper oxides, iron oxide (C. I. Pigment black 11), and other metals, aniline black (C. I. Pigment black 1) and other organic pigments, but carbon black pigments which have a relatively low specific weight and do not easily settle out in water are preferable for inkjet use. These pigments can be used individually or as a blend of two or more.

The white ink composition contains a white pigment. Examples of white pigments include titanium dioxide, zirconium dioxide, and other periodic table group IV element oxides. In addition, calcium carbonate, calcium sulfate, zinc oxide, barium sulfate, barium carbonate, silica, alumina, kaolin, clay, talc, white clay, aluminum hydroxide, magnesium carbonate, and white hollow resin emulsion and the like, and preferably a blend of one or more types selected from a group consisting of these pigments is used.

A hollow resin emulsion refers to an oil based dispersion that contains fine hollow polymer particles, wherein the fine hollow polymer particles consist of subgroups of a plurality of fine particles, and with regards to the average particle size, the difference in the average particle size of adjacent fine particle subgroups is less than 100 nm.

The primary particle size of the aforementioned white pigment is preferably less than 1 μm, from the perspective of whiteness.

Herein, the term "primary particle size" refers to the size of a particle formed by conglomerating individual crystals or similar crystal particles. The primary particle size is measured using an electron microscope method. This method measures the size of the pigment particle from an electron microscope photograph, and a more reliable value can be determined by dispersing the pigment in an organic solvent, fixing on a support film, performing image processing from a transmission type electron microscope photograph, and measuring. Specifically, the longitudinal diameter and the lateral diameter of each of the primary particles is measured, the diameter of the circle of the equal surface area is calculated and used as the primary particle size, and the average value of 50 or more randomly selected pigment particles from a fixed view is determined. Other measurement methods can also be used so long as equivalent reliability can be achieved, but if there is a significant difference in the values, the values determined by the aforementioned method are used.

The chromatic color ink composition and the black ink composition can be appropriately determined, but the amount of pigment in the ink composition is between 0.1 and 30 wt %, preferably between 0.5 and 12 wt %. The amount of pigment in the white ink composition is preferably 1.0 wt % or higher, more preferably at 5.0 wt % or higher, and even more preferably 10 wt % or higher but 20 wt % or less, from the perspective of whiteness.

The ink composition that is used in the ink set of this aspect uses a pigment as a colorant, and preferably contains a dispersing agent in order to disperse the pigment. The dispersing agent can be used without restriction, so long as the dispersing agent can be used in a pigment ink, and examples include cationic dispersing agents, anionic dispersing agent nonionic dispersing agents and surfactants and the like.

Examples of anionic dispersing agents include polyacrylic acid, poly methacrylic acid, acrylic acid-acrylonitrile copolymer, vinylacetate-acrylic acid ester copolymer, acrylic acid-alkyl acrylate ester copolymer, styrene-acrylic acid copolymer, styrene-methacrylic acid copolymer, styrene-acrylic acid-alkyl acrylate ester copolymer, styrene-methacrylic acid-alkyl acrylate ester copolymer, styrene-α-methylstyrene-acrylic acid copolymer, styrene-α-methylstyrene-acrylic acid-alkyl acrylate ester copolymer, styrene-maleic acid copolymer, vinylnaphthalene-maleic acid copolymer, vinylacetate-ethylene copolymer, vinylacetate-fatty acid vinylethylene copolymer, vinylacetate-maleic acid ester copolymer, vinylacetate-crotonic acid copolymer, and vinylacetate-acrylic acid copolymer and the like.

Examples of nonionic dispersing agents include polyvinyl pyrrolidone, polypropylene glycol, and vinylpyrrolidone-vinylacetate copolymer, and the like.

Examples of surfactant as dispersing agents include anionic surfactants such as sodium dodecylbenzene sulfonate, sodium laurate, and ammonium salts of polyoxyethylene alkyl ether sulfate; and nonionic surfactants such as polyoxyethylene alkyl ether, polyoxyethylene alkyl ester, polyoxyethylene sorbitan fatty acid ester, polyoxyethylene alkylphenyl ether, polyoxyethylene alkylamine, and polyoxyethylene alkylamide, and the like. In particular, the use of styrene-(meth)acrylic acid copolymer is preferable from the perspective of increasing pigment dispersion stability.

The oil based ink composition that is used in this aspect can also contain other additives which are normally added to oil based ink compositions. Examples of these additives include stabilizers (such as antioxidants or ultraviolet light absorbers).

Examples of antioxidants include BHA (2,3-butyl-4-oxyanisole) and BHT (2,6-di-t-butyl-p-creosol), and examples of ultraviolet light absorbers include benzophenone based compounds, and benzotriazole based compounds.

The oil based ink composition can be prepared by a commonly known and used method. For example, if a pigment is used as the colorant, first the pigment, dispersing agent, and (a part of) the aforementioned blend of diethylene glycol compound and dipropylene glycol compound are mixed together, and then a pigment dispersion is prepared using a bowl mill, bead mill, ultrasonic waves, or jet mill or the like, in order to achieve the desired ink characteristics. Next, an oil based pigment ink composition can be obtained by adding a binder resin, the aforementioned blend of diethylene glycol compound and dipropylene glycol compound (remainder), and other additives (such as dispersion assisting agents and viscosity adjusting agents) while mixing. Furthermore, a pigment and a dye can be used together as the colorant, and the oil based ink composition can be obtained by a similar method as the method of preparing the oil based pigment ink composition.

This aspect can provide the aforementioned ink set as an ink container that contains the chromatic color ink compositions.

Inkjet Printing Method

The inkjet recording method of this aspect forms an image using the aforementioned ink set using the inkjet recording method by driving an inkjet head, ejecting droplets of the ink composition, and causing the droplets to adhere to the recording medium.

If the oil based ink composition that includes a metallic pigment is used individually, an image can be formed with a metallic gloss where the degree of mirror surface gloss measured at 20°, 60°, and 85° is no less than 200, 200, and 100 respectively, as measured in accordance with JIS Z 8741. By using this oil based ink composition, an image can be formed with the desired metallic gloss, ranging from a matte finish to a gloss finish.

Specifically, if an image is formed which has measured values for the degree of mirror surface gloss on the recording medium at angles of 20°, 60°, and 85° as defined by JIS Z 8741 are simultaneously not less than 200 but less than 400, 200 or higher but less than 400, and 100 or higher, respectively, the image can have a metallic gloss that is a flat gloss finish (matte finish).

Furthermore, an image which has measured values for the degree of mirror surface gloss on the recording medium at angles of 20°, 60°, and 85° as defined by JIS Z 8741 are simultaneously not less than 400 but less than 600, 400 or higher but less than 600, and 100 or higher, respectively, can have a metallic gloss that has some shine to the degree that an object reflected in the image that is formed will be somewhat distinguishable.

Furthermore, a metallic glossy image with measured values for the degree of mirror surface gloss at angles of 20°, 60°, and 85° as defined by JIS Z 8741 are simultaneously 600 or higher, 600 or higher, and 100 or higher, respectively, will be sharp, and can have a metallic gloss that has so-called "mirror surface shine" to the degree that an object reflected in the image that is formed will be clearly distinguishable.

The oil based ink composition containing a metallic pigment, and the oil based ink composition containing the chromatic color ink composition, the black ink composition, and the white ink composition can be simultaneously ejected to form an image. Thereby, a colored metallic finish can be provided to a colored finish of chromatic color pigment, black pigment, and white pigment.

If the oil based ink composition containing the metallic pigment and the oil based ink compositions such as the chromatic color ink composition, black ink composition, and white ink composition are ejected separately, the image is preferably formed by using the oil based ink composition containing metallic pigment to form an image with a metallic gloss, and then forming an image using the chromatic color ink compositions. The metallic pigment will not easily penetrate into an ink receptor layer regardless of whether or not the recording medium has an ink receptor layer, but will be attached to the surface of the recording medium. In contrast, the pigment that is included in the chromatic color ink composition will easily penetrate into an ink receptor layer if ejected onto a recording medium which has an ink receptor layer. Therefore, if the oil based ink composition containing metallic pigment is ejected to form an adhesive layer of metallic pigment on the recording medium, and then the pigment of the colored ink is made to adhere thereon, the color of the pigment of the color ink composition will be more vivid.

Furthermore, an image with metallic gloss can be formed using the oil based ink composition containing a metallic pigment, then forming an image with a metallic gloss of any color using the chromatic color ink composition, and then forming an image using the black ink composition and/or the white ink composition.

The method described below is suggested as a method for ejecting the ink composition.

A first method is an electrostatic aspiration method, and is a system of applying a strong electric field between a nozzle and an acceleration electrode placed in front of the nozzle, continuously ejecting droplets of ink from the nozzle, and while the ink droplets are traveling between the deflecting electrodes, applying a printing information signal to the deflecting electrode, and recording, or a system of ejecting ink droplets corresponding to the printing information signal without deflection.

A second method is a method that of forcefully ejecting ink droplets by mechanically vibrating the nozzle using a water crystal oscillator while applying pressure on the ink solution using a small pump. The ink droplets that are ejected are electrically charged while being ejected, a printing information signal is applied to a deflecting electrode while the ink droplets are traveling between the deflection electrodes.

A third method is a system that uses a piezoelectric element, where recording is performed by simultaneously applying pressure and printing information signal to the ink solution using a piezoelectric element, ejecting the ink droplets.

A fourth method is a method where the ink solution is suddenly expanded in volume by the effect of thermal energy, and uses a system where recording is performed by heating an ink solution to form bubbles using an ultrasmall electrode in accordance with a printing information signal, and ejecting the ink droplets.

Any of the aforementioned methods can be used with the inkjet recording method of this embodiment, but the method of ejecting the ink composition without heating is preferable from the perspective of printing at high speed. In other words, the first method, second method, or third method are preferably used.

The recording medium is not particularly restricted, and for example, various types of recording media can be used, such as normal paper, special inkjet paper (matte paper, glossy paper), glass, plastic film such as polyvinylchloride, film where a substrate is coated with a plastic or receptive layer, metal, and printed circuit boards and the like.

If the recording medium has an ink receptive layer, the recording medium is preferably printed without heating, from the perspective of avoiding heat damage.

On the other hand, from the perspective of achieving a high gloss, if the recording medium does not has an ink receptive layer, the recording medium is preferably heated and printed.

The method of heating can be a method of heating by bringing the recording medium into contact with a heating source, or irradiating with infrared rays or microwaves (electromagnetic waves with extremely large wave length of approximately 2,450 MHz) or the like, or heating by blowing hot air without contacting the recording medium, and the like.

The heating is preferably performed prior to printing and/or during printing and/or after printing. In other words, the recording medium can be heated prior to printing, at the same time as printing, or after printing, and heating can be performed throughout the printing process. The heating temperature is dependent on the type of recording medium, but is preferably between 30 and 80° C., more preferably between 40 and 60° C.

Recording Device

The inkjet recording device of this aspect forms an image using the aforementioned ink set by ejecting droplets of the ink composition, and causing the droplets to adhere to the recording medium.

Recorded Matter

The recorded matter of this aspect is recorded using the aforementioned ink set, the aforementioned inkjet recording method, and the aforementioned inkjet recording device. The recorded matter is obtained by the inkjet recording method using the aforementioned ink set, and therefore recorded matter can be obtained which has an image with a metallic finish in any arbitrary color.

Embodiments

1. Metallic Ink Composition (1) Preparation of Metallic Pigment Dispersion

A resin coating solution containing 3.0 wt % of cellulose acetate buterate (butylation ratio between 35 and 39%, manufactured by Kanto Chemical Co., Inc.) and 97 wt % diethylene glycol diethyl ether (manufactured by Nippon Nyukazai Co., Ltd.) was uniformly applied by a bar coating method onto a 100 μm thick PET film, and then dried for 10 minutes at 60° C. to form a thin resin film on a PET film.

Next, an aluminum vapor deposition layer with an average thickness of 20 nm was formed on the aforementioned resin layer using a vacuum deposition device (vacuum deposition device model VE-1010 manufactured by Vacuum Device Co.).

Next, the multilayer body formed by the aforementioned method is simultaneously peeled, pulverized, and dispersed in the diethylene glycol diethyl ether using a VS-150 ultrasonic disperser (manufactured by As One Corp.), and a metallic pigment dispersion was formed by ultrasonically dispersing for 12 cumulative hours.

The metallic pigment dispersion that was obtained was filtered using an SUS mesh filter with 5 μm openings to remove the coarse particles. Next, the filtrate was poured into a round bottomed flask and the diethylene glycol diethyl ether was distilled off using a rotary evaporator. Thereby the metallic pigment dispersion was concentrated, and later the concentration of the metallic pigment dispersion was adjusted to obtain a metallic pigment dispersion 1 with a concentration of 5 wt %.

Furthermore, metallic pigment dispersions 2, 3 were prepared using metallic pigment where the vapor deposition conditions and/or the ultrasonic dispersing time were changed.

Furthermore, 50% average particle diameter R50 of a corresponding circle in the longitudinal diameter (X direction)–lateral diameter (Y direction) plane of each of the metallic pigments and the average thickness Z were measured using a particle diameter and grain distribution analyzer (FPIA-3000S manufactured by Sysmex Corp.), and R50/Z was calculated based on the measurement values obtained for R50 and Z. The results are shown in Table 1.

TABLE 1

| Metallic pigment dispersion | 50% average particle diameter R50 (μm) | Average film thickness Z (μm) | R50/Z |
|---|---|---|---|
| 1 | 1.03 | 0.02 | 51.5 |
| 2 | 1.13 | 0.02 | 56.5 |
| 3 | 0.86 | 0.02 | 43.0 |

(2) Preparation of the Metallic Ink Composition

Metallic pigment ink compositions were prepared according to the formulations shown in Table 2 and Table 3 using the metallic pigment dispersion that was prepared by the aforementioned method. After blending and dissolving the solvent and additives to make the ink solvent, the metallic pigment dispersion was added to the ink solvent, and then blended and stirred using a magnetic stirrer for 30 minutes at ambient temperature and pressure to make metallic pigment ink compositions (S1 through S7).

The diethylene glycol diethyl ether (DEGDE) and the tetraethylene glycol dimethyl ether (TEGDM) shown in Table 2 and Table 3 were manufacture by Nippon Nyukazai Co. Ltd. Furthermore, the γ-butyrolactone was manufactured by Kanto Chemical Co. Inc. In addition, the N-2043-AF-1, and N-2043-60MEX (polyacryl polyol resin emulsion) are manufactured by Harima Chemical Co. Inc., the IB-F370 (polyurethane resin) was manufactured by Sanyo Chemical Co., Ltd., and the BYK-3500 (surfactant) was manufactured by BYK Chemie Japan. Note, the units are in wt %.

TABLE 3

| | Metallic ink composition | | | | |
|---|---|---|---|---|---|
| Ink Composition | S3 | S4 | S5 | S6 | S7 |
| DEGDE | 61.8 | 61.0 | 57.8 | 61.3 | 60.8 |
| γ-butyrolactone | 15.0 | 15.0 | 15.0 | 15.0 | 15.0 |
| TEGDM | 18.0 | 18.0 | 18.0 | 18.0 | 18.0 |
| N-2043-60MEX | 4.0 | 4.0 | — | 4.0 | 4.0 |
| IB-F370 | — | — | 6.0 | — | — |
| BYK-3500 | 0.2 | — | 0.2 | 0.2 | 0.2 |
| E-1010 | — | 1.0 | — | — | — |
| Pigment solid content (%) | 1.0 | 1.0 | 1.0 | 1.5 | 2.0 |
| Metallic pigment dispersion | 2 | 2 | 2 | 3 | 3 |

2. Color Ink Composition (1) Formulation of Color Ink Composition

A yellow ink composition, magenta ink composition, light magenta ink composition, cyan ink composition, light cyan ink composition, black ink composition, and white ink composition were prepared according to the formulations shown in Table 4 and Table 5. Note, the "dispersing agent" was a polyester based polymer compound, "N-2043-AF-1" and "N-2043-60MEX" was in a polyacryl polyol resin emulsion, the "solvent blend" was a blend of diethylene glycol diethyl ether (70 wt %) and γ-butyrolactone (15 wt %), and tetraethylene glycol dimethyl ether (15 wt %). Furthermore, the values shown in Table 4 and Table 5 are in units of wt %.

TABLE 4

| Ink component | Yellow Y1 | Magenta M2 | Light magenta LM3 | Cyan C4 | Light cyan LC5 | Black B6 | White W7 | White W8 |
|---|---|---|---|---|---|---|---|---|
| PY151 | 4 | | | | | | | |
| PR122 | | 4 | 1 | | | | | |
| PB 15:3 | | | | 3 | 0.8 | | | |
| Carbon black | | | | | | 4 | | |
| Titanium dioxide | | | | | | | 5 | |
| Hollow resin emulsion | | | | | | | | 5 |
| Dispersing agent | 2.5 | 2 | 0.5 | 2 | 0.5 | 2 | 3 | — |
| Polyoxyethylene derivative | 2 | 2 | 0.5 | 2 | 0.4 | 2 | — | — |
| N-2043-AF-1 | 2.0 | 2.0 | 3.0 | 2.0 | 3.0 | 2.0 | 4.0 | 5.0 |
| Organic solvent blend | Balance | Balance | Balance | Balance | Balance | Balance | Balance | Balance |

TABLE 2

| | Metallic ink composition | |
|---|---|---|
| Ink composition | S1 | S2 |
| DEGDE | 47.8 | 61.8 |
| DPGMB | 45 | |
| γ-butyrolactone | | 15 |
| TEGDM | | 18 |
| N-2043-AF-1 | 6.0 | 4.0 |
| BYK-3500 | 0.2 | 0.2 |
| Pigment solid content (metallic pigment dispersion) | 1.0 (1) | 1.0 (2) |

TABLE 5

| Ink complement | Color ink composition | | | | |
|---|---|---|---|---|---|
| | Y9 | M10 | C11 | B12 | W13 |
| PY213 | 6.0 | | | | |
| PV19 | | 6.0 | | | |
| PB 15:3 | | | 3.0 | | |
| PBk7 | | | | 4.0 | |
| Hollow resin emulsion | | | | | 10.0 |
| Dispersing agent | 2.0 | 3.0 | 2.0 | 2.0 | — |
| N-2043-60MEX | 4.0 | 4.0 | 4.0 | 4.0 | 5.0 |

TABLE 5-continued

| Ink complement | Color ink composition | | | | |
|---|---|---|---|---|---|
| | Y9 | M10 | C11 | B12 | W13 |
| BYK-3500 | 0.2 | 0.2 | 0.2 | 0.2 | 0.2 |
| Organic solvent blend | Balance | Balance | Balance | Balance | Balance |

(2) Preparation Method for Ink Compositions

Of the aforementioned formulation components, the pigment, dispersing agent, and solvent blend (a portion) were mixed for 1 hour at 3000 rpm using a dissolver, and then preliminarily dispersed in a bead mill filled with zirconia beads (2 mm). The average of particle size of the pigment particles obtained by this preliminary dispersion was 5 μm or less. Next, full dispersing was performed using a nanomill filled with zirconia beads (0.3 mm) to obtain the pigment dispersion. The average particle size of the pigment particles obtained by this full dispersion was between 50 nm and 200 nm, depending on the type of pigment.

While mixing the pigment dispersion obtained at 4000 rpm, N-2043-AF-1, normal additives, polyoxyethylene derivative, hollow resin emulsion, and organic solvent blend (remainder) were added, the pigment weight was adjusted to make the wt % shown for the composition in order to obtain the desired color ink composition (Y1 through W8).

The desired color ink compositions (Y9 through W13) were obtained in a similar manner.

Note, the aforementioned hollow resin emulsion was manufactured as shown below.

(a) Polymer Particle 1

80 parts of styrene, 5 parts of methacrylic acid, 15 parts of methyl methacrylate, 1 part of α-methylstyrene dimer, 14 parts of t-dodecylmercaptan, 0.8 parts of sodium dodecylbenzene sulfonate, 1.0 part of potassium persulfate, and 200 parts of water were placed in a 2 L reaction vessel, and while mixing under a nitrogen gas environment, the temperature was increased to 80° C. and emulsion polymerization was performed for 6 hours. The polymer particles 1 obtained thereby had an average particle size of 150 nm (0.15 μm).

(b) Hollow Polymer Fine Particle Emulsion 1

10 parts (calculated as solid content) of the polymer particles 1 obtained in item (a) was combined with 0.3 parts of sodium lauryl sulfate, 0.5 parts of potassium persulfate, and 400 parts of water in a reaction vessel and then a cross-linking polymeric monomer composition containing 11.6 parts of divinyl benzene (purity 55 wt %, remainder is monofunctional vinylmonomer) 8.4 parts of ethyl vinylbenzene, 5 parts of acrylic acid, and 75 parts of methyl methacrylate was added and mixed for 1 hour at 30° C., and then emulsion polymerization was performed while mixing for 5 hours at 70° C. to obtain an aqueous dispersion. When the product obtained was measured using a particle analyzer (Microtrack UPA: Nikkiso Co., Ltd.), the particle size was 320 nm, and when observed under a transmission type electron microscope, hollow polymer fine particles were observed.

3. Ink Set

Ink sets were prepared by combining the ink compositions obtained in 1 and 2 above, using the combinations shown in Table 6 and Table 7.

TABLE 6

| Ink set component | Metallic ink | Colored ink | Black ink | White ink |
|---|---|---|---|---|
| A | S1 | Y1, M2, LM3, C4, LC5 | — | — |
| B | S2 | Y1, M2, LM3, C4, LC6 | — | — |
| C | S1 | Y1, M2, LM3, C4, LC5 | B6 | W7 |
| D | S2 | Y1, M2, LM3, C4, LC5 | B6 | W8 |
| E | S2 | Y1, M2, LM3, C4, LC5 | B6 | W7 |
| F | S1 | Y1, M2, LM3, C4, LC5 | B6 | W8 |
| G | S2 | Y1, M2, C4 | B6 | W7 |

TABLE 7

| Ink set component | Metallic ink | Colored ink | Black ink | White ink |
|---|---|---|---|---|
| H | S3 | Y9, M10, C11 | B12 | W13 |
| I | S4 | Y9, M10, C11 | B12 | W13 |
| J | S5 | Y9, M10, C11 | B12 | W13 |
| K | S6 | Y9, M10, C11 | B12 | W13 |
| L | S7 | Y9, M10, C11 | B12 | W13 |

4. Printing Evaluation Test (1) Printing Evaluation Test 1

Two inkjet printers SJ-540 manufactured by Roland D. G. were used with the ink sets shown in 3 above. The ink compositions corresponding to each of the color systems was added to one inkjet printer, or in other words the black ink composition, yellow ink composition, magenta ink composition, cyan ink composition, light magenta ink composition, and light cyan ink composition were added to the yellow system, magenta system, cyan system, light magenta system, and light cyan system, respectively. The metallic ink composition was added to the black system and the white ink composition was added to the yellow system of the second inkjet printer. The heating temperature for both of the inkjet printers was 50° C., and printing was performed using the printing pattern shown below. A vinyl chloride sheet (Viewcal 2000 (white): product of Sakurai Co. Ltd.), a PET film (PG-50L: product of Lami Corporation Inc.), and a polycarbonate film (Iupilon FE-2000: Mitsubishi Engineering Plastics Corporation) cut to A4 size were used as the recording medium. Furthermore, functional evaluation of the printed matter was based on the following evaluation standard. The results are shown in Table 8.

AAA: Any metallic finish from high metallic gloss to matte finish can be obtained.

AA: A metallic finish gloss was obtained where a reflected object could clearly be identified A: A metallic finish gloss was obtained where a reflected object could barely be identified B: A flat finish metallic gloss was obtained (matte finish)

C: A glossy metallic finish could not be obtained

The printing patterns using the aforementioned ink set were as shown below.

Printing Pattern 1

Printing was performed by ejecting each of the ink composition simultaneously.

Printing Pattern 2

Printing was performed by ejecting the metallic ink compositions, and then printing was performed by ejecting the chromatic color ink composition and the black ink composition. In this case, the gloss could be masked by printing the black ink composition over the metallic print.

c. Printing Pattern 3

Printing was performed by ejecting the metallic ink compositions, and then printing was performed by ejecting the chromatic color ink composition, and finally printing was performed by ejecting the white ink composition and the black ink composition. In this case, the gloss could be changed to a matte finish by printing the white ink composition over the glossy metallic print.

TABLE 8

|  | Ink set | Printing Pattern | | |
|---|---|---|---|---|
|  |  | 1 | 2 | 3 |
| Embodiment 1 | A | B | A | — |
| Embodiment 2 | B | A | AA | — |
| Embodiment 3 | C | B | A | A |
| Embodiment 4 | D | A | AA | AA |
| Embodiment 5 | E | A | AA | AA |
| Embodiment 6 | F | B | A | A |
| Embodiment 7 | G | A | A | AA |

(2) Printing Evaluation Test 2

Using two inkjet printers PM-4000PX (product of Seiko Epson) containing a metallic ink composition S1 and an ink set that combines the aforementioned oil based ink compositions, the black ink composition, yellow ink composition, magenta ink composition, cyan ink composition, light magenta ink composition, and light cyan ink composition were added to the corresponding color systems of the first inkjet printer. The metallic ink composition S1 was added to the black system of the second inkjet printer. The white ink composition was added to the yellow system.

Furthermore, printing was performed according to the aforementioned printing patterns at ambient temperature onto glossy photographic paper with an ink receptor layer, (manufactured by Seiko Epson, product number: KA450PSK). Similarly, printing was performed in the same manner using the metallic ink composition S2 in place of the metallic ink composition S1. Furthermore, functional evaluation of the printed matter was based on the above evaluation standard. The results are shown in Table 9.

TABLE 9

|  | Ink set | Printing Pattern | | |
|---|---|---|---|---|
|  |  | 1 | 2 | 3 |
| Embodiment 8 | A | A | A | — |
| Embodiment 9 | B | AA | AA | — |
| Embodiment 10 | C | A | A | A |
| Embodiment 11 | D | AA | AA | AAA |
| Embodiment 12 | E | AA | AA | AAA |
| Embodiment 13 | F | A | A | A |
| Embodiment 14 | G | A | A | AAA |

As shown in Table 9, recorded matter with a metallic finish image in an arbitrary color could be achieved using the inkjet printing method and the ink set described above.

(3) Printing Evaluation Test 3

Printed matter was obtained in a manner similar to the printing evaluation test 1 shown in 4 (1), and a functional evaluation of the printed matter was similarly performed based on the same evaluation criteria. The results are shown in Table 10.

TABLE 10

|  | Ink set | Printing Pattern | | |
|---|---|---|---|---|
|  |  | 1 | 2 | 3 |
| Embodiment 15 | H | AA | AA | AAA |
| Embodiment 16 | I | A | A | AA |
| Embodiment 17 | J | A | A | AA |
| Embodiment 18 | K | AA | AA | AAA |
| Embodiment 19 | L | A | A | A |

(4) Printing Evaluation Test 4

Printed matter was obtained in a manner similar to the printing evaluation test 2 shown in 4 (2), and a functional evaluation of the printed matter was performed based on the same evaluation criteria. The results are shown in Table 11.

TABLE 11

|  | Ink set | Printing Pattern | | |
|---|---|---|---|---|
|  |  | 1 | 2 | 3 |
| Embodiment 20 | H | AA | AA | AAA |
| Embodiment 21 | I | AA | AA | AAA |
| Embodiment 22 | J | AA | AA | AAA |
| Embodiment 23 | K | AA | AA | AAA |
| Embodiment 24 | L | A | A | A |

As shown in Table 11, recorded matter with a metallic finish image in an arbitrary color could be achieved using the inkjet printing method and the ink set described above.

What is claimed is:

1. An ink set, comprising:
   an ink composition containing a metallic pigment;
   a chromatic color ink composition containing chromatic color pigment; and
   at least one or more ink compositions selected from a group consisting of a black ink composition containing black pigment and a white ink composition containing white pigment;
   wherein images having measured values of no less than 200, 200, and 100 respectively, for the degree of mirror surface gloss measured at 20°, 60°, and 85° as defined by JIS Z 8741 can be formed when said ink composition containing the metallic pigment is ejected on a recording medium.

2. The ink set according to claim 1, wherein the recording medium is photographic paper.

3. The ink set according to claim 1, wherein the metallic pigment is a plate-like particle, where, on a planar surface of the plate-like particle, a longitudinal diameter is X, a lateral diameter is Y, and a thickness is Z, a 50% average particle diameter R50 which is the diameter of a corresponding circle determined by a surface area in the X-Y plane of the plate-like particle is between 0.5 and 3 μm, and R50/Z>5 is satisfied.

4. The ink set according to claim 1, the ink set comprising the white ink composition.

5. The ink set according to claim 1, the ink set comprising the black ink composition.

6. The ink set according to claim 1, comprising:
the black ink composition; and
at least one of a set containing both a magenta ink composition and a light magenta ink composition, or a set containing both a cyan ink composition and a light cyan ink composition, as the chromatic color ink composition.

7. The ink set according to claim 1, comprising:
the black ink composition; and
a magenta ink composition, a light magenta ink composition, a cyan ink composition and a light cyan ink composition, as the chromatic color ink composition.

8. The ink set according to claim 1, wherein the ink composition containing the metallic pigment contains an organic solvent, and the organic solvent includes one or more alkylene glycol ether that is a liquid at ambient temperature and pressure.

9. The ink set according to claim 1, wherein the ink composition containing the metallic pigment contains a resin, and the resin is at least one type of resin selected from a group consisting of polyvinyl butyral, cellulose acetatobutyrate, and polyacryl polyol, polyurethane, vinylchloride-vinylacetate copolymer and/or a resin emulsion thereof.

10. The ink set according to claim 1, wherein the ink composition containing the metallic pigment further comprises at least one acetylene glycol based surfactant and/or silicone based surfactant.

11. An ink set, comprising:
an ink composition containing a metallic pigment; and
at least one or more ink compositions selected from a group consisting of a chromatic color ink composition containing a chromatic color pigment, a black ink composition containing a black pigment, and a white ink composition containing a white pigment,
wherein the metallic pigment is a plate-like particle, where, on a planar surface of the plate-like particle, a longitudinal diameter is X, a lateral diameter is Y, and a thickness is Z, a 50% average particle diameter R50 which is the diameter of a corresponding circle determined by a surface area in the X-Y plane of the plate-like particle is between 0.5 and 3 μm, and R50/Z>5 is satisfied.

* * * * *